Dec. 11, 1962 — A. E. SHAW — 3,067,499
SINKER APPLYING DEVICE
Filed Nov. 9, 1959
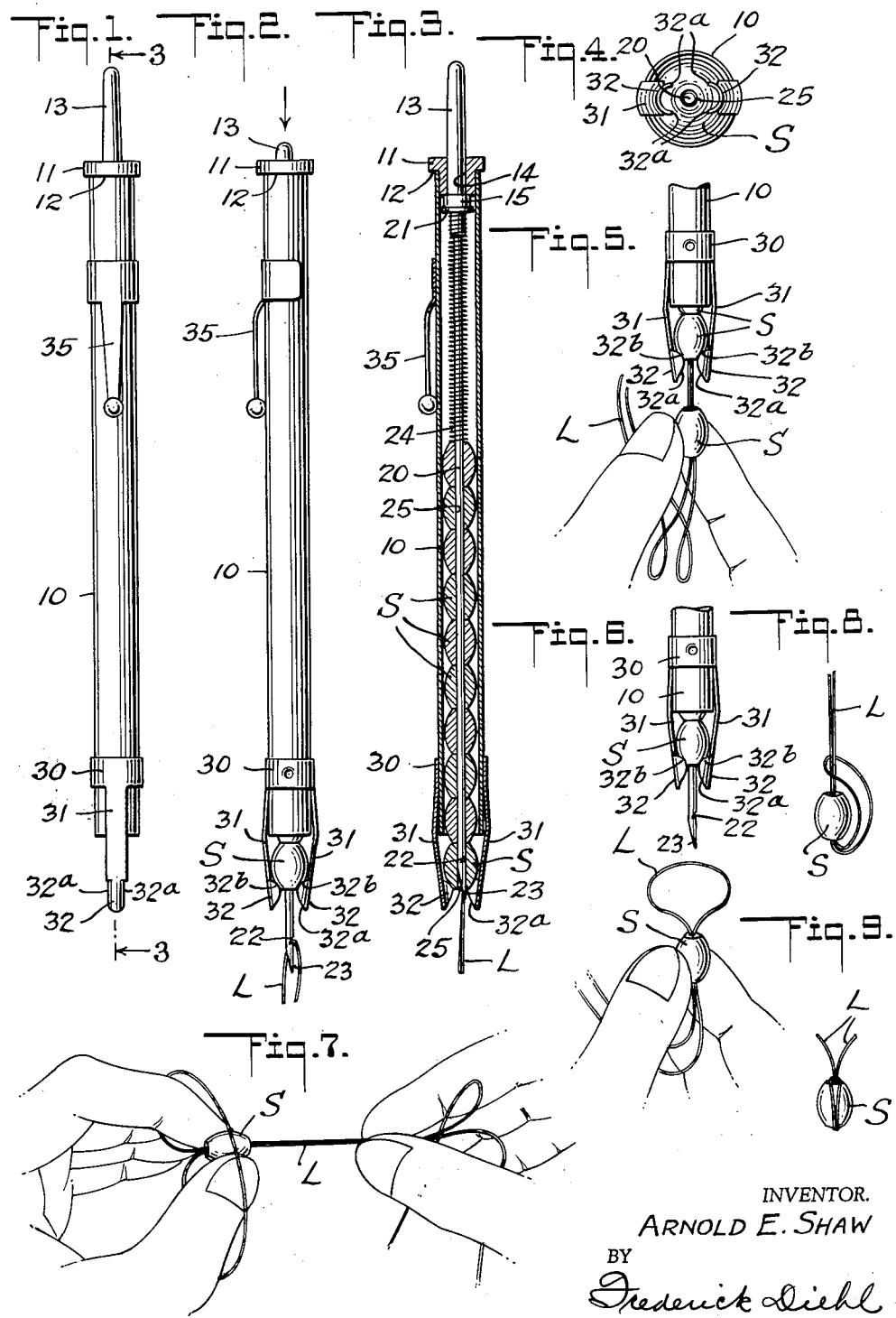
INVENTOR.
ARNOLD E. SHAW
BY
Frederick Diehl
ATTORNEY

United States Patent Office 3,067,499
Patented Dec. 11, 1962

3,067,499
SINKER APPLYING DEVICE
Arnold E. Shaw, Los Angeles, Calif., assignor of one-half to Charles J. Curtiss, Los Angeles, Calif.
Filed Nov. 9, 1959, Ser. No. 851,906
6 Claims. (Cl. 29—212)

This invention relates generally to the art of angling and more particularly to fishing lines.

An object of my invention is to provide a device for applying a sinker to any part of a fishing line with the utmost ease and dispatch and in a manner to obviate the use of split rivets and other weight adding attachments with their attendant disadvantages.

Another object of my invention is to provide a sinker applying device which not only facilitates and expedites the applying operation but utilizes a sinker of conventional or standard construction obtainable wherever fishing supplies are sold, and enables a sinker to be instantly removed from the line without cutting the line or damaging the sinker, to the end that the sinker may be reused indefinitely.

A further object of my invention is to provide a device of the above described character which is of simple and compact construction enabling the device to be conveniently carried on the person for manipulation to easily and quickly apply a sinker to the fishing line, and which embodies a magazine capable of carrying a number of sinkers for convenient use in successive order as the occasion requires.

With these and other objects in view, my invention resides in the combinations, arrangements and functional relationships of elements as set forth in the following specification and particularly pointed out in the appended claims.

In the accompanying drawings,

FIGURE 1 is a view in side elevation showing the device embodying my invention;

FIGURE 2 is a view similar to FIGURE 1 and rotated 90 degrees therefrom with a fishing line operatively associated therewith to illustrate the initial step of applying a sinker to the line;

FIGURE 3 is a longitudinal axial sectional view taken on the line 3—3 of FIGURE 1 and illustrating the second step in applying the sinker to the line;

FIGURE 4 is an enlarged view of the device in end elevation; and

FIGURES 5, 6, 7, 8 and 9 are fragmentary pictorial views illustrating successive steps to complete the application of the sinker to the line.

Referring specifically to the drawings, the device embodying my invention comprises a support in the form of an open ended cylindrical barrel 10, one end of which is closed by a plug 11 having a flange 12 seating against the end of the barrel. An actuator in the form of a pin 13 is freely reciprocable in a bore 14 through the plug 11 and is provided with a head 15 engageable with the inner end of the plug to limit the axial movement of the pin outwardly of the plug.

Working in the barrel 10 is a line attaching member in the form of a rod 20 approximating the length of the barrel. The rod 20 is provided with a flanged collar 21 at one end and with a line receiving notch or hook 22 adjacent to its other end which latter is tapered to a blunt point as indicated at 23. Fixed to the collar 21 is one end of a coil spring 24 which freely surrounds the rod and is of a length when unloaded, to approximate the length of the rod.

The rod 20 is of a diameter to freely pass through the longitudinal passage 25 of a conventional form of sinker S so as to enable a number of the sinkers to be mounted on the rod with the innermost sinker bearing against the free end of the spring 24 which is increasingly loaded as sinkers are applied to the rod. Fastened to the barrel 10 adjacent to its open end is a collar 30 from which extends at diametrically opposed locations resilient or spring arms 31 the free ends of which are disposed beyond the open end of the barrel and are provided with stop elements or jaws 32 urged towards each other by the arms.

The jaws 32 co-act with the outermost or leading sinker S on the rod 20 in releasably retaining the sinkers on the rod with the outermost sinker beyond the end of the barrel on the free end portion of the rod. Each of the elements 32 is constructed to provide spaced stop portions 32a having rounded cam surfaces 32b which engage the periphery of the outermost sinker at circumferentially spaced locations, with the sinker conveniently accessible for grasping between the fingers when it is desired to remove a sinker for use on the fishing line. A suitable spring clip 35 is provided on the barrel 10 to enable the device to be carried on the person.

The operation of the device is as follows:

The barrel 10 is held in one hand while a finger thereof depresses the actuator 13 so as to project the free end portion of the rod 20 from the outermost sinker S and expose the notch 22 as shown in FIGURE 2.

The fishing line is now hooked into the notch 22 at the location on the line at which a sinker is to be applied, and the line held taut as the actuator is released to enable the hooked portion of the line to be drawn into the passage 25 of the outermost sinker by the rod 20 under the urging action of the spring 24 as shown in FIGURE 3.

The outermost sinker is now grasped between the fingers and pulled axially past the stop elements 32 by camming the latter outwardly against the urging action of the arms 31, thus leaving a bight portion of the line L connected to the rod 20 and threaded through the passage 25 of the removed sinker as the next succeeding sinker in the barrel is advanced by the spring 24 into engagement with the stop elements 32 as shown in FIGURE 5.

The actuator 13 is again depressed to expose the notch 22 from which the bight portion of the line is now disengaged and opened to enable the sinker on the line to be easily passed through the bight as shown in FIGURE 7, following which the line is pulled through the sinker to reduce the size of the bight as shown in FIGURE 8 until the bight is finally pulled tightly against the side of the sinker as shown in FIGURE 9, yet enable the sinker to be instantly removed from the line by reversing the steps of FIGURES 7, 8 and 9.

From the foregoing description, it will be manifest that the device embodying my invention as above described, enables the fisherman to have a supply of sinkers conveniently at hand and to apply one or more sinkers to the line at any location along the length thereof with the utmost ease and dispatch, yet enable the sinkers to be easily removed from the line without damaging either line or sinkers.

I claim:

1. A sinker applying device comprising: a barrel having an open end and providing a magazine for sinkers having a line receiving passage therethrough; a rod reciprocably movable in the barrel and on which the sinkers may be slidably mounted one in advance of the other; said rod having a notch adjacent to its outer end adapted to receive a bight portion of a fishing line to connect the latter to the rod; spaced stop elements yieldably mounted on the barrel and disposed beyond the open end thereof; said elements being urged towards each other for co-action with the outermost sinker on the rod in releasably retaining the sinkers against discharge from the rod; a coil spring mounted on the rod to urge the sinkers outwardly of the barrel and the rod inwardly of the latter; an actuator; and means mounting said actuator on the barrel for engagement with said rod to move the latter outwardly of the barrel from a retracted position wherein said notch is in the passage of the sinkers to an advanced position wherein said notch will be exposed beyond the outermost sinker on the rod to receive the bight portion of the line, so that upon release of the actuator the bight portion will be pulled into the passage of said outermost sinker and will be threaded through the passage of the latter upon withdrawing said outermost sinker from said rod while the bight portion remains engaged with said notch within the passage of the next succeeding sinker on the rod until the rod is again moved to said advanced position to expose the notch for disengagement of the bight of the line therefrom.

2. A sinker applying device as embodied in claim 1 wherein said stop elements are provided with cam surfaces engaging the sinker at circumferentially spaced locations to facilitate spreading apart of the stop elements by the sinker when manually withdrawing the latter from the rod.

3. A sinker applying device comprising: a barrel open at one end through which sinkers having a passage therethrough are insertable into the barrel; a rod reciprocably movable in the barrel on which sinkers can be slidably mounted one in advance of the other; yieldable stop elements on the barrel urged towards each other for co-action with the outermost sinker on the rod in releasably retaining the sinkers against discharge from the rod; a coil spring on the rod co-acting therewith and with the innermost sinker on the rod to urge the sinkers outwardly of the barrel until stopped by said stop elements and to urge the rod inwardly of the barrel; an actuator; and means mounting said actuator in the other end of the barrel to engage said rod and move same outwardly of the barrel against the action of said spring; said rod having a notch adjacent to its outer end disposed to receive a bight portion of a fishing line when said rod is moved outwardly of the barrel by said actuator from a retracted position wherein said notch is in the passage of the sinkers to an advanced position wherein the notch is exposed beyond said outermost sinker to receive the bight portion of the line, so that upon release of the actuator the bight portion will be pulled into the passage of the outermost sinker and will be threaded through the passage of the latter upon withdrawing said outermost sinker from the rod while the bight portion of the line remains engaged with said notch.

4. A device for applying sinkers having a passage therethrough to a fishing line comprising: a barrel having one end open; a cap closing the other end of the barrel; a rod reciprocably mounted in the barrel, having a flange at its inner end and a line-receiving notch adjacent to its outer end; spring arms projecting from said open end of the barrel and having jaws urged towards each other to co-act in releasably retaining sinkers on the rod against discharge therefrom; a coil spring on the rod engaging said flange and the innermost sinker on the rod to urge the sinkers outwardly of the barrel until stopped by said jaws and to urge the rod inwardly of the barrel to a retracted position wherein said notch is in the passage of the sinkers; and an actuating pin reciprocably mounted in said cap and bearing against said flange to move the rod to an advanced position wherein said notch is exposed beyond the outermost sinker on the rod to receive a bight portion of the fishing line so that upon release of said pin said bight portion will be pulled into the passage of said outermost sinker and will be threaded through the passage of the latter upon withdrawing said outermost sinker from said rod and jaws.

5. A sinker applying device comprising: a tubular support providing a magazine for sinkers having a line-receiving passage therethrough; a member reciprocably movable in said support and on which the sinkers may be slidably mounted; said member having a notch provided with a retaining portion for receiving a bight portion of a fishing line to connect same to the member; means urging said member in one direction and sinkers on the member in the opposite direction outwardly of said support; means co-actable with the outermost sinker on said member at a location exteriorly of the support and acting automaticaly to releasably retain the sinkers on the member against the action of said urging means; a manually operable actuator; and means mounting said actuator on the support to move said member in opposition to the action of said urging means outwardly through the outermost sinker on the member from a retracted position wherein said notch is in the passage of the sinkers, to an advanced position wherein said notch will be exposed beyond the outermost sinker on said member to receive the bight portion of the line, so that upon release of the actuator the bight portion will be pulled by said notch into the passage of the outermost sinker and will be threaded through the passage of the latter upon manually withdrawing said outermost sinker from said member while the bight portion of the line remains connected to said notch.

6. A sinker applying device comprising: a barrel open at one end through which sinkers having a passage therethrough are insertable into the barrel; a member reciprocably movable in the barrel on which the sinkers may be slidably mounted one in advance of the other; yieldable means on the barrel co-actable with the outermost sinker on the member and automatically operable to releasably retain the sinkers against discharges from the member; means co-acting with said member and with the innermost sinker thereon to urge the sinkers outwardly of the barrel and the member inwardly thereof; and actuating means by which said member can be manually moved outwardly of the barrel against the action of said urging means; said member having a notch adjacent to its outer end for retaining the bight portion of a fishing line when said member occupies an advanced position wherein said notch is exposed beyond the outermost sinker on the member, so that upon release of the actuator the bight portion will be pulled by said notch into the passage of the outermost sinker and will be threaded through the passage of the latter upon manually withdrawing said outermost sinker from said member.

References Cited in the file of this patent

UNITED STATES PATENTS

| | | |
|---|---|---|
| 1,955,559 | Narrow | Apr. 17, 1934 |
| 2,584,231 | Schmidt | Feb. 5, 1952 |
| 2,688,816 | Bondesen | Sept. 14, 1954 |
| 2,790,341 | Keep et al. | Apr. 30, 1957 |
| 2,876,534 | Savona | Mar. 10, 1959 |
| 2,883,743 | Estabrook | Apr. 28, 1959 |

FOREIGN PATENTS

| | | |
|---|---|---|
| 734,640 | Germany | Apr. 21, 1943 |